July 14, 1936.  F. E. BACHMAN  2,047,248
TRUCK FRAME MOUNTING
Filed May 14, 1930  6 Sheets-Sheet 1
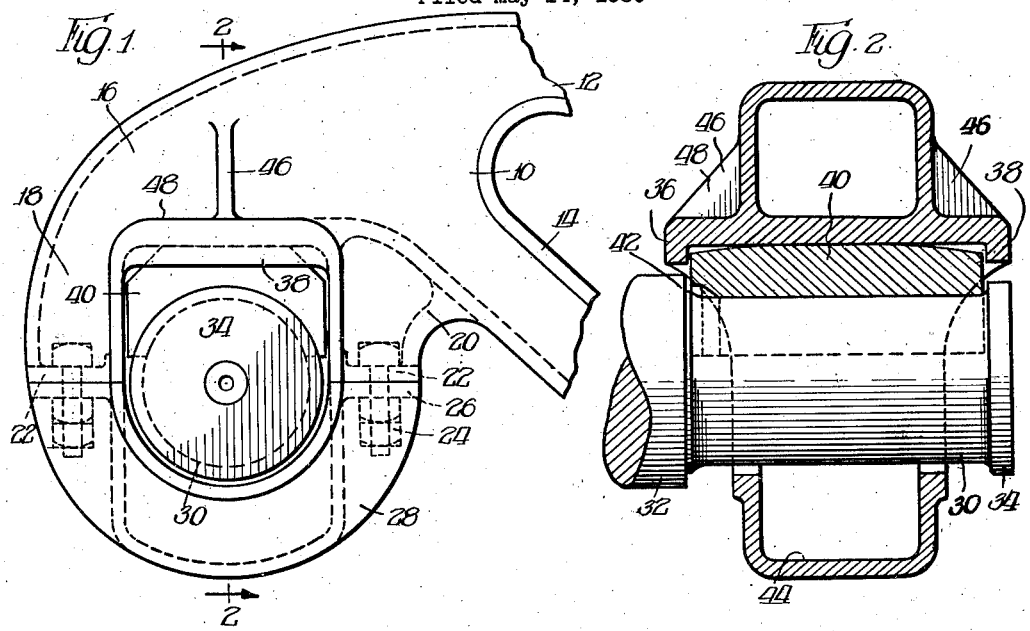
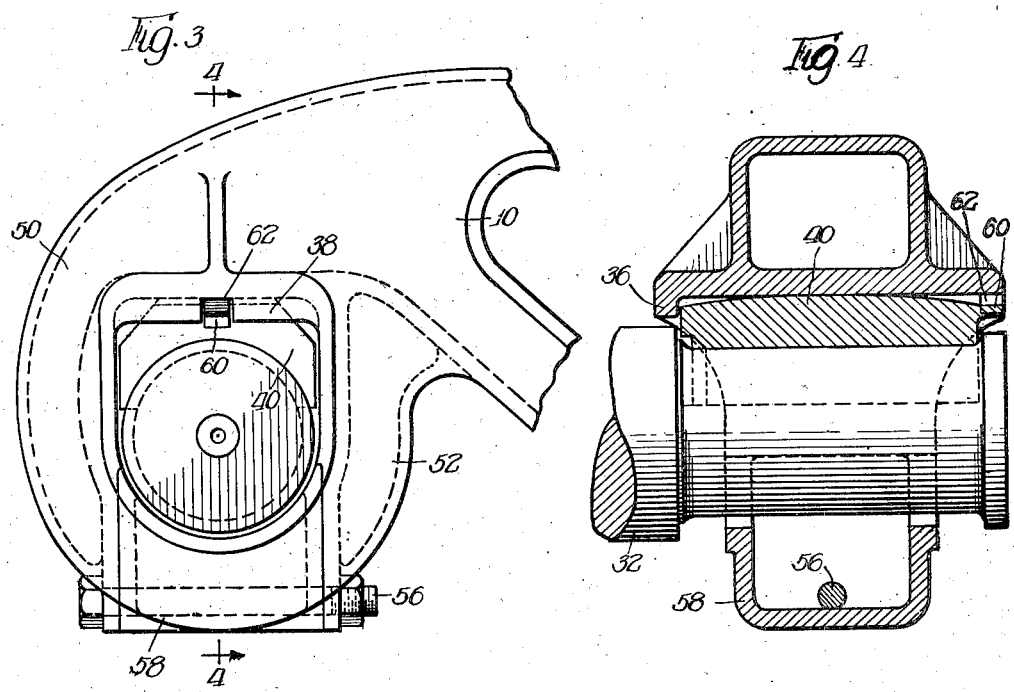
Inventor:
Fred E. Bachman,
By Wilkinson, Huxley, Byron & Knight
attys.

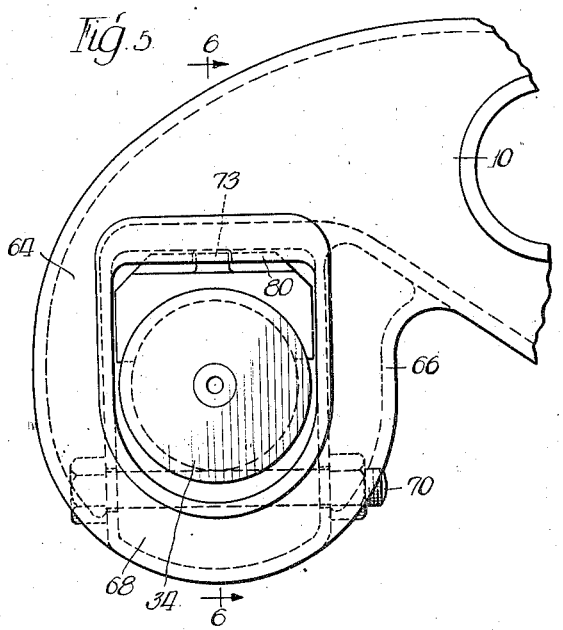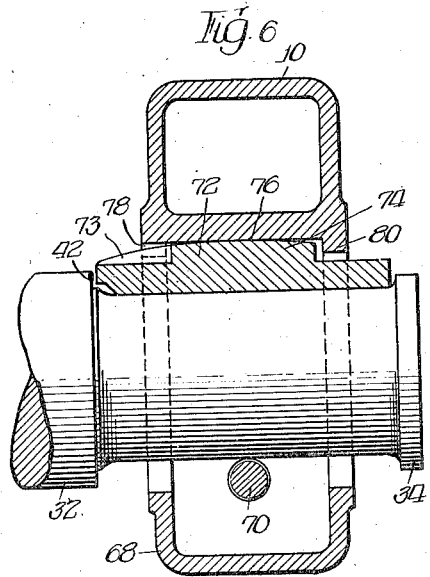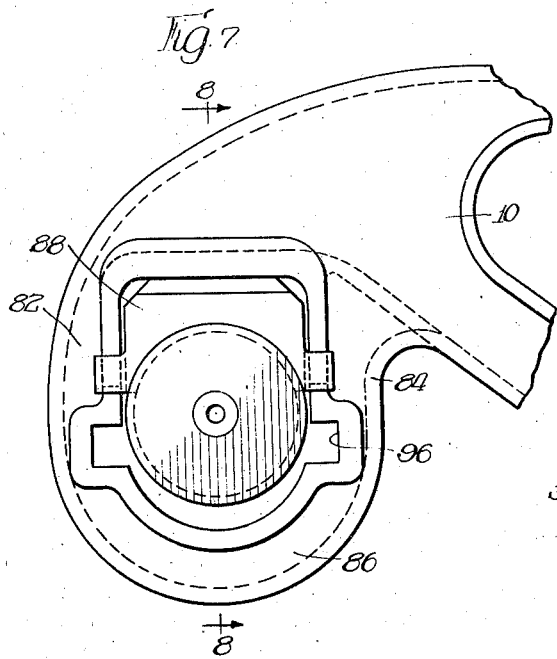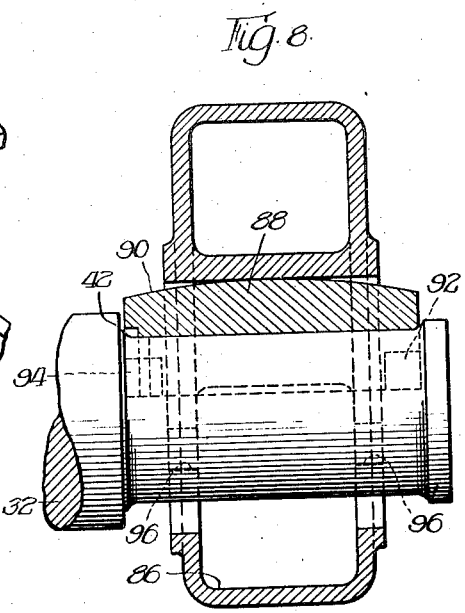

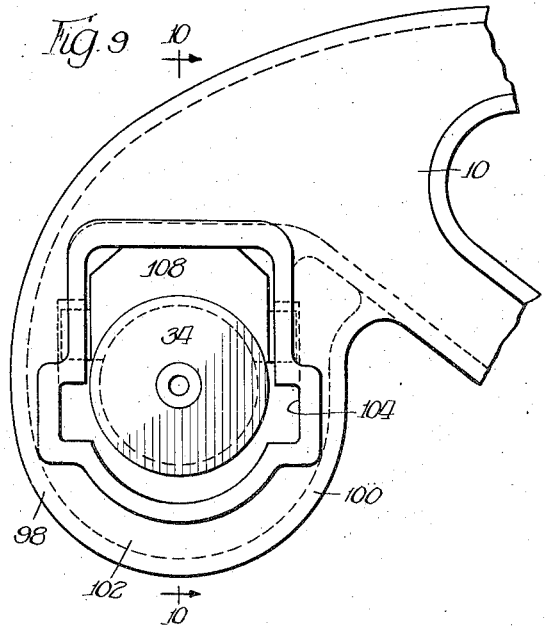
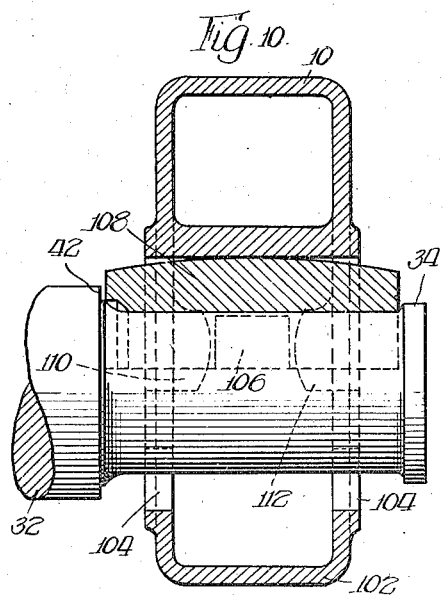
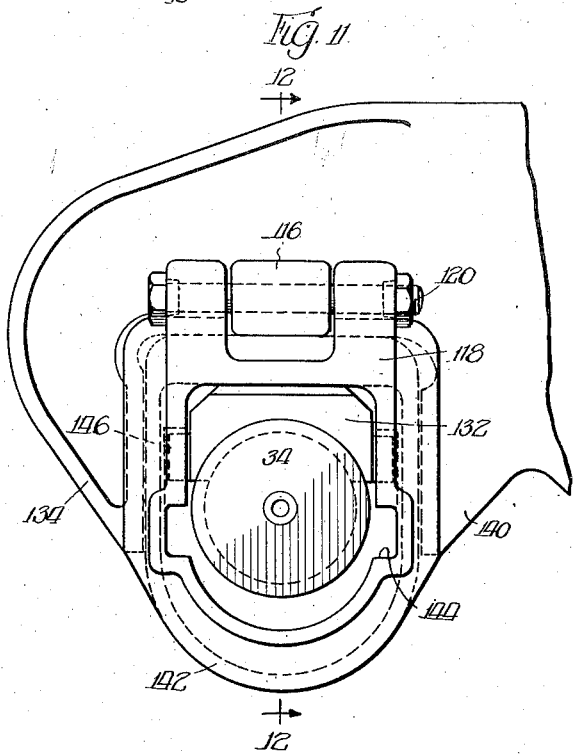
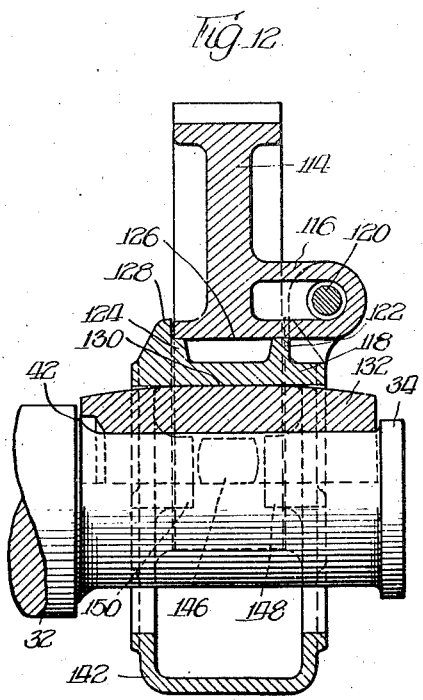

July 14, 1936.   F. E. BACHMAN   2,047,248
TRUCK FRAME MOUNTING
Filed May 14, 1930   6 Sheets-Sheet 4
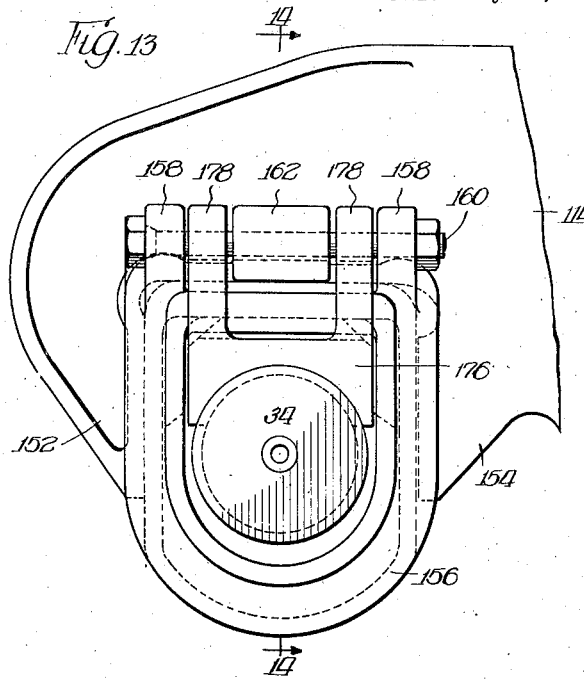
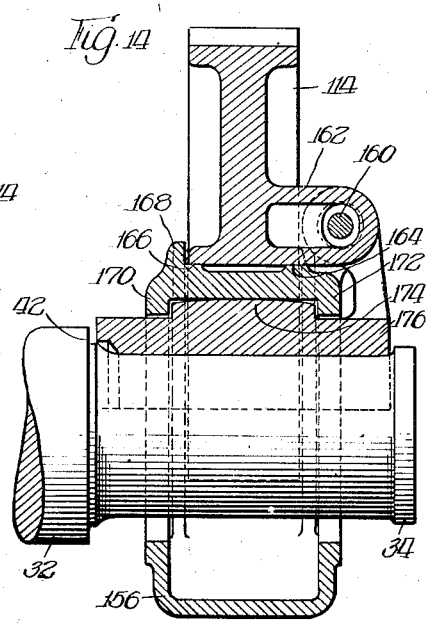
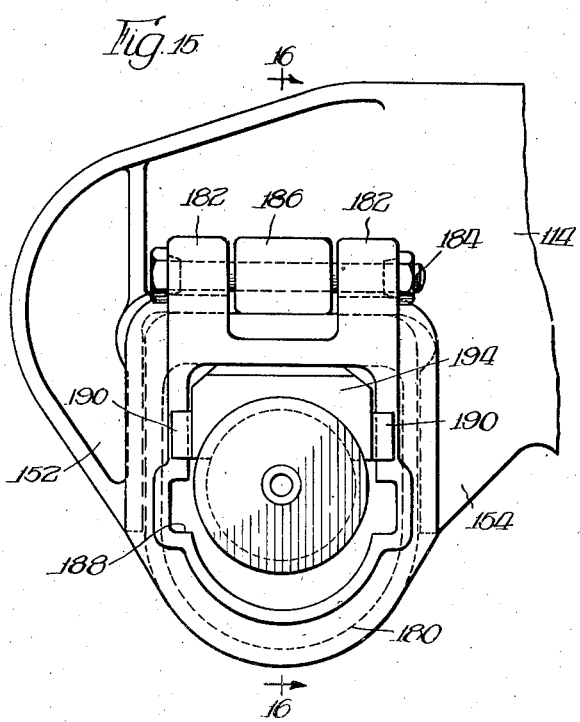
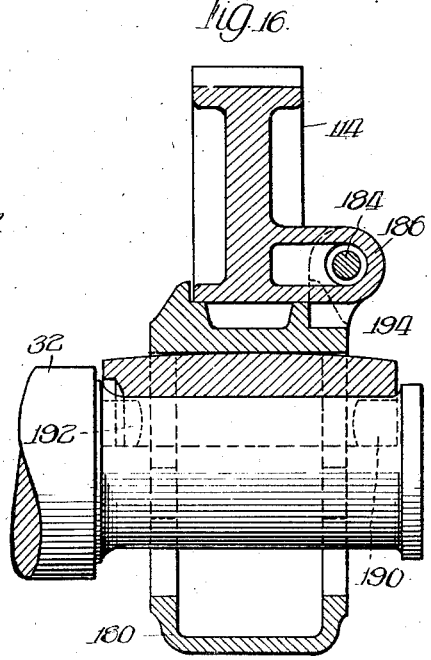
Inventor:
Fred E. Bachman

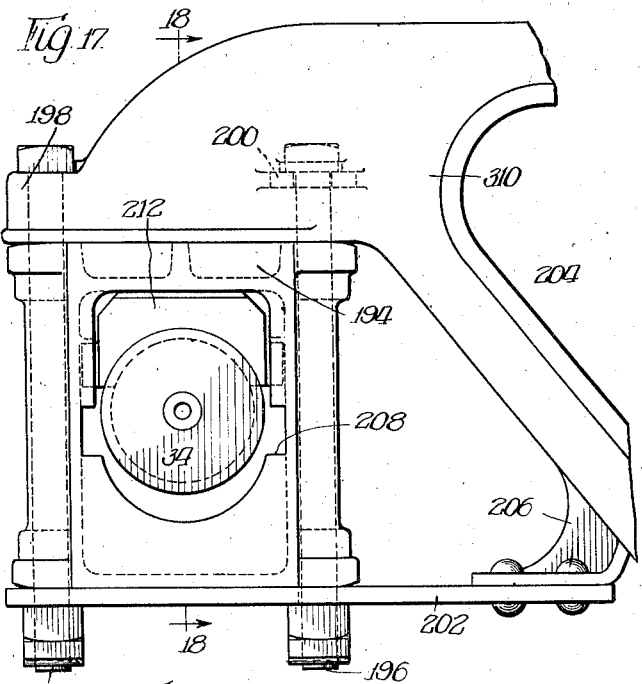
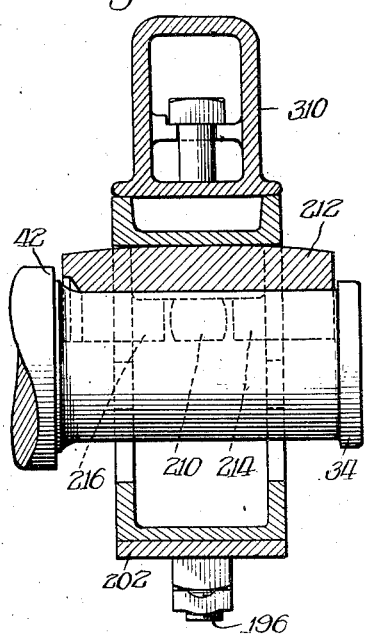
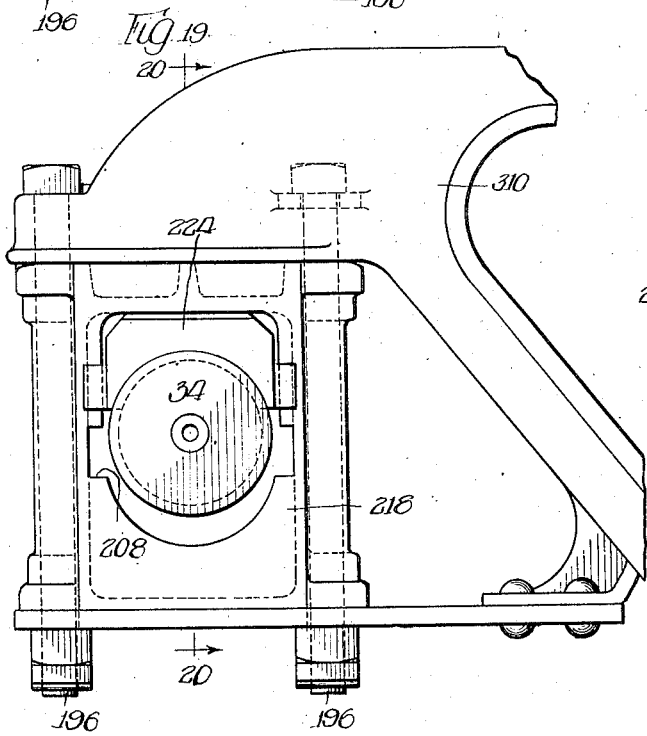
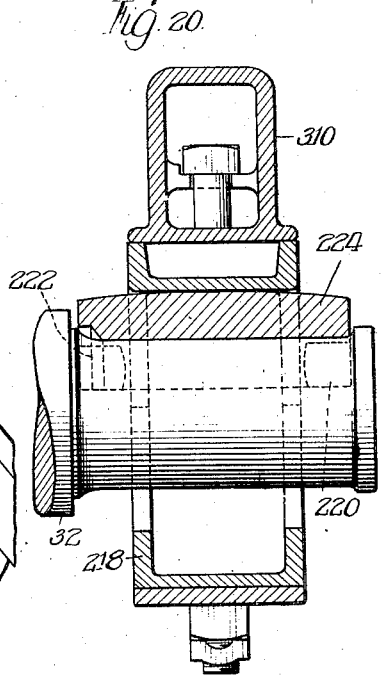

July 14, 1936.  F. E. BACHMAN  2,047,248
TRUCK FRAME MOUNTING
Filed May 14, 1930  6 Sheets-Sheet 6
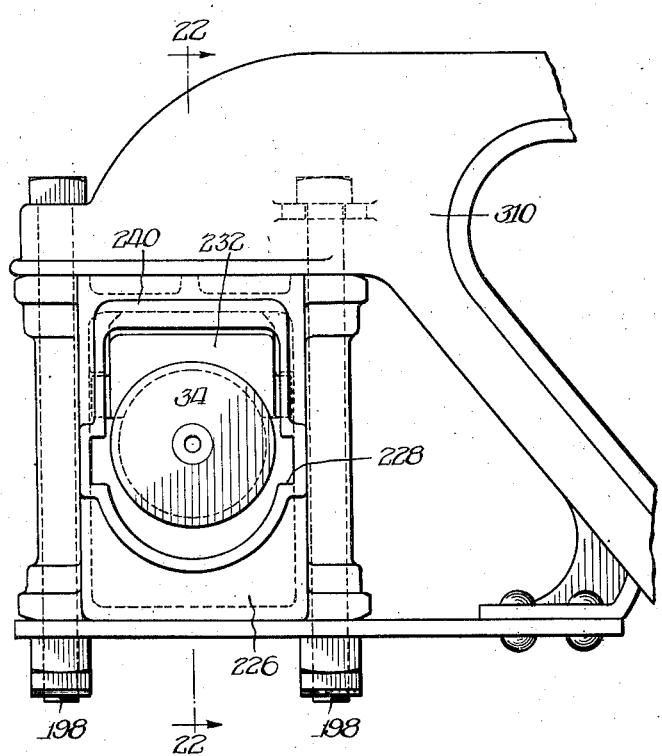
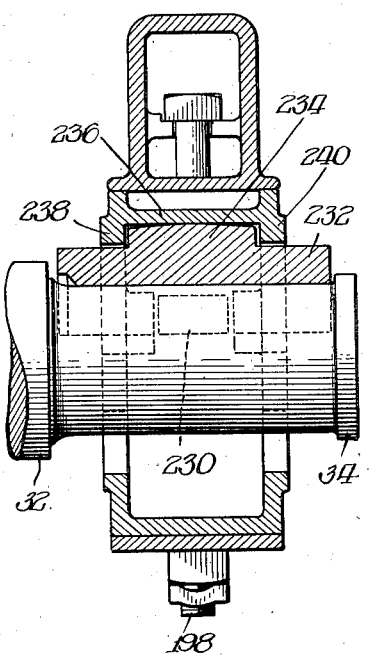
Inventor:
Fred E. Bachman,
By Wilkinson, Huxley, Byron & Knight
attys Patented July 14, 1936

2,047,248

UNITED STATES PATENT OFFICE 2,047,248

TRUCK FRAME MOUNTING

Fred E. Bachman, Chicago, Ill., assignor to American Steel Foundries, Chicago, Ill., a corporation of New Jersey Application May 14, 1930, Serial No. 452,196

24 Claims. (Cl. 105—221)

This invention pertains to truck frame mountings, and more particularly to retaining mountings on truck frames for roller bearing assemblies.

In roller bearing wheel and axle assemblies of the improved type as shown in application Serial No. 182,734, filed April 11, 1927, there is usually provided an outer revoluble axle upon which the wheels are mounted, an inner normally stationary axle extending through the outer axle and spaced therefrom, and the roller bearings mounted between said axles, it being understood that the inner axle is the one usually supported in the journal boxes or in suitable bearings on the truck side frames or equalizers. As the supported axle is a normally stationary one, it will be appreciated that it is unnecessary to provide a journal box of the usual type in the truck side frames. It must be kept in mind, however, that the roller bearing axle unit is one such that in case of failure or binding of the roller bearing, the inner axle rotates and the bearing between the normally stationary axle and the truck side frame must function as the usual friction bearing.

It is therefore an object of this invention to provide a mounting for the inner axle of a roller bearing assembly such as will permit the side frame to oscillate freely vertically as well as laterally within the usual limits of the axle ends, and in case of emergency will permit the normally stationary axle to rotate on a seat or bearer for performing the function of the usual friction bearing.

Another object is to provide a truck frame mounting for a wheel and axle assembly which will permit the required freedom of movement between the side frame and the axle and will provide effective securing means for the axle permitting ready dismantling for the purpose of applying or removing the wheel and axle assemblies for assembling or repair purposes.

Still another object is to provide a supporting construction adapted for use with roller bearing wheel and axle assemblies and one which may be readily utilized with any type of side frame.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a fragmentary side elevation of a portion of a truck side frame embodying the invention;

Figure 2 is a transverse sectional elevation through the truck side frame and one end of a normally stationary axle of a wheel and axle assembly, the same being taken substantially in the plane as indicated by the line 2—2 of Figure 1;

Figures 3, 5, 7, 9, 11, 13, 15, 17, 19, and 21 are fragmentary side elevations of portions of truck side frames embodying modified forms of the invention; and Figures 4, 6, 8, 10, 12, 14, 16, 18, 20, and 22 are transverse elevations taken on the correspondingly numbered section lines.

Referring first of all more particularly to the application of the invention as shown in Figures 1 and 2, the side frame 10 is provided with compression and tension members 12 and 14 merging at their ends into a portion 16 provided with a jaw end having downwardly projecting members or pedestals 18 and 20, said jaw end being substantially U-shape in elevation as shown in Figure 1. The members 18 and 20 are provided with webs 22 adapted to receive the bolt or other fastening means 24 adapted to extend through a complementary web 26 provided on the bottom closure member 28, which is also substantially U-shaped in elevation as shown in Figure 1, whereby an opening is provided through which the end bearing 30 of the normally stationary axle 32 extends, the end of the axle 32 being provided with an enlarged flange portion 34. The jaw of the side frame is provided with spaced depending lugs or flanges 36 and 38 between which the bearer pad or bearing 40 is adapted to extend, said bearer pad having cooperative relation with the flange 34 and the shoulder formed by the enlarged portion 42 of the axle whereby endwise movement of the axle within the side frame is limited. The lower member 28 is provided with a cavity 44 extending below the axle and formed to contain a lubricant or waste for lubrication of the bearing surface between the pad 40 and the portion 30 of the axle in case there is creeping or rotation of the axle with respect to the pad. The pad is provided with an upper convex surface cooperating with a portion of the journal box between the lugs 36 and 38 whereby rocking or oscillatory movement between the axle and side frame is permitted. As shown, suitable gussets or brackets 46 are provided extending between the portion 16 and the overhanging portions 48 of the jaw member adjacent the flanges 36 and 38 for suitably reinforcing the jaw adjacent its bearing.

In the construction shown in Figures 3 and 4 the jaw members 50 and 52 of the truck side frame are extended lower than those shown in Figures 1 and 2, being provided with depending flanges 54 for the reception of a bolt or other securing means 56 extending through the flanges 54 and through an intermediate member 58 disposed between said flanges, said member being U-shaped in section as shown in Figure 4 for the reception of oil or waste for lubricating the axle 32 in case of creeping or rotation thereof. In this construction the bearing pad 40 is provided with an outwardly extending lug 60 extending through an interrupted portion 62 of the flange 38 whereby the pad is prevented from any tendency of rotation with the axle, the flanges 36 and 38 preventing excessive endwise movement of the axle within the frame, as in the case of the construction illustrated in Figures 1 and 2.

In the construction shown in Figures 5 and 6, the jaw members 64 and 66 of the side frame 10 are extended to a point below the axle 32, and are provided with a closure member 68 secured to the jaw members by means of a bolt or other securing means 70, the member 68 forming a lubricant or waste pocket for lubrication of the axle 32. The axle bearer or pad 72 is provided with a raised center portion 74, said portion being slightly arched as at 76 to permit oscillation of the side frame on the axle bearer, the side frame being provided with depending flanges or lugs 78 and 80 cooperating with the raised portion of the axle bearer for limiting endwise movement between the side frame and the axle due to contact between the portions 42 and 34 of the axle with the end of the axle bearer. The raised portion 72 may be provided with a lug 73 extending through an interrupted portion of the flange 78 whereby rotation of the axle bearer is prevented.

In the modification shown in Figures 7 and 8, the side frame 10 is provided with the depending jaws 82 and 84 shown integrally connected with the lower U-shaped portion 86 providing a recess for the reception of oil or waste for lubrication of the axle 32 extending between the jaws. The axle is provided with the portion 42 and the end flange 34 between which there is extended the axle bearer or pad 88, the same being slightly crowned as at 90 for oscillatory engagement with the portion of the frame 10 between the jaws. The axle bearer is provided with extending lugs 92 and 94, adapted to be positioned on the outside of the jaws, and on the outside and the inside of the frame, so that it may be said that the pairs of lugs 92 and 94 embrace the jaws of the side frame. The jaws are provided with notched or slotted portions 96 for permitting assembly of the axle bearer, the lugs 94 being passed through the notches 96 to operative position. The slots are so arranged that the bearer and the axle cannot both be removed at the same time, it being necessary to hold the bearer in position when separating the axle from the bearer, so that it is not possible for the assembly to become accidentally disengaged.

In the construction shown in Figures 9 and 10, the jaws 98 and 100 are similar to the jaws 82 and 84, being shown integrally connected by means of the U-shaped member 102, the jaws being provided with notched portions 104 for the reception and passage of spaced locking lugs 106 provided on the crowned axle bearer 108, said axle bearer being disposed between the axle 32 in the portion of the side frame 10 and located between the shoulders 42 and 34 of the axle to prevent excessive endwise movement between the axle and side frame. The jaws 98 and 100 are each provided with spaced lugs 110 and 112 for receiving the lugs 106 whereby the same are positioned. In this modification, as well as the modification illustrated in Figures 7 and 8, it is necessary to hold the bearer in position in separating the axle from the bearer, the slots being so arranged that the bearer and axle both cannot be removed at the same time, whereby accidental disengagement is prevented.

In the modification shown in Figures 11 and 12, the structures shown in Figures 9 and 10 are slightly varied due to the difference in the form of the side frame 114. Said side frame is provided with a lug 116 to which is loosely pivoted the auxiliary bearing member or box 118 pivoted thereto as by means of a bolt 120. The auxiliary bearing member 118 is provided with spaced lugs 122 and 124 adapted to contact the lower portion 126 of the side frame. A shoulder 128 on the lug 124 serves as a positioning member, the lower surface 130 of the member 118 being adapted to have contact with the upper crowned surface of the bearing pad 132, so it will be seen that the member 118 forms an auxiliary wearing portion for preventing excessive wear on the side frame. The jaws 134 and 140 of the side frame are shown integrally joined by means of the U-shaped portion 142 and said jaws are provided with notches 144 for permitting insertion of the lugs 146 formed intermediate the ends of the bearing pad, it being understood that the bearing pad is disposed between the shoulders 42 and 34 on the axle 32. The lugs 146 are adapted to be positioned between the spaced lugs 148 and 150 provided on the inside of the jaws 134 and 140, the construction being such that accidental disassociation of the parts is prevented as the slots are so arranged that the bearer and axle cannot be removed at the same time.

In the modification shown in Figures 13 and 14 the Vulcan type of side frame 114 is provided with the spaced pedestal jaws 152 and 154 between which is secured the box 156 which is provided with upstanding lugs 158 for accommodating securing means such as the bolt 160 passing through said spaced lugs and through a lug 162 provided on the side frame. The member 156 extends through the jaws and is provided with spaced members 164 and 166, said members being adapted to contact the frame between the jaws, the shoulder 168 being provided for limiting endwise movement of the member 156. The member 156 is provided with depending flanges or lugs 170 and 172, said lugs embracing the upstanding curved portion 174 of the bearing pad 176, said pad being disposed between the raised portion 42 and the flange 34 of the axle 32. The member 156 extends down below the axle and is substantially U-shaped, such as shown in Figure 14, for accommodating lubricant or waste for lubricating the axle in case there is any rotation thereof. The bearing pad 176 is provided with spaced upstanding lugs 178 secured by the bolt 160 to the lugs 162 whereby a unitary assembly is formed.

The modification shown in Figures 15 and 16 is substantially the same as the modification illustrated in Figures 7 and 8, except that the Vulcan side frame 114 is provided with the depending jaws 152 and 154, and a box 180 is bolted to the frame by means of the upstanding lugs 182 provided on said box, said lugs accommodating the bolt 184 securing said box to a lug 186 provided on the side frame. The box is provided with notches 188 whereby the lugs 190 and 192 of the bearing pad 194 may be slipped through said notches for assembling the bearing pad with the axle 32. As in the case of the modification shown in Figures 7 and 8, the notches or slots are so arranged that the bearer or pad and the axle both cannot be removed at the same time.

In the modification shown in Figures 17 and 18, an Andrews type frame 310 is shown, wherein it is necessary to bolt a housing 194 to the frame by means of the vertical bolts or securing means 196, said bolts passing through a portion of the housing and portions 198 and 200 of the frame, and also through a retaining plate 202 secured to the tension member 204 of the side frame through the bracket 206. In this modification the housing is provided with notches 208 for accommodating and permitting passage of the lug 210 provided on the bearing pad or axle bearer 212, said lug 210 being adapted to be associated with lugs 214 and 216 provided on the housing whereby endwise movement of the axle 32 is prevented due to cooperation between the shoulder 42 and the flange 34 and the axle bearer. In this case the housing is also U-shaped, as shown in Figure 18, for accommodation of lubricant or lubricating waste.

In the modification shown in Figures 19 and 20, an Andrews type of frame 310 is also shown. In this case the housing 218, which is secured by bolts 196 to the frame 310 as has been described with respect to Figures 17 and 18, is provided with notches 208 permitting passage of the spaced lugs 220 and 222 on the axle bearer 224, said lugs cooperating with a portion of the housing for preventing endwise movement of the axle bearer, the axle bearer in this case, as well as in the modification illustrated in Figures 17 and 18, having an upper arcuate surface cooperating with a portion of the housing. As before, the housing is substantially U-shaped in section as viewed in Figure 20 for accommodation of lubricant or waste for lubricating the axle 32.

In the modification shown in Figures 21 and 22, a similar construction is shown as has been described with respect to Figures 17 and 18 wherein a housing 226 is bolted to the Andrews type of frame 310 by means of the vertical bolts 196. The housing is provided with notches 228 for passage of the lug 230 provided on the axle bearer 232, said axle bearer having cooperative relation with the axle 32 as has been described. In this case the axle bearer is provided with an upstanding portion 234 having cooperative relation with a portion 236 of the housing whereby oscillatory movement is permitted, the housing being provided with flanges or lugs 238 and 240 for preventing undue sidewise movement of the axle bearer and consequently the axle. As before, the lower portion of the housing is U-shaped as viewed in Figure 22 for accommodation of lubricant or lubricating waste.

It will thus be seen that in the constructions shown, there are provided a number of means of supporting the axle with respect to the frame wherein simple methods are disclosed permitting relative movement of the normally fixed axle in case of flexing, and wherein simple methods are provided whereby repair parts may be readily substituted, yet the constructions are rugged.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In an axle mounting, the combination of a side frame having spaced jaws defining a seat therebetween, an axle extending between said jaws, a bearing between said axle and seat, said jaws having a member of substantially less width than said bearing and defining a lubricant cavity substantially beneath said axle, the clearance between said axle and said member being less than the distance the bearing must be moved for disassembly from said side frame.

2. In an axle mounting, the combination of a side frame having spaced jaws defining a seat therebetween, an axle extending between said jaws, a bearing between said axle and seat, said jaws being connected by a member of substantially less width than said bearing and extending beneath said axle and providing a lubricant cavity therefor, the clearance between said axle and said member being less than the distance the bearing must be moved for disassembly from said side frame.

3. In an axle mounting, the combination of a side frame having spaced jaws defining a seat therebetween, said jaws having a member therebetween defining a lubricant cavity, an axle extending between said jaws, and a bearing between said axle and seat and having direct bearing engagement therewith, said frame having means cooperating with said bearing for limiting certain movements of said axle, said means including a notch on said frame and a lug on said bearing insertable through said notch axially of said axle whereby said bearing is inserted into and removed from its operative position with respect to the axle and side frame, said axle being in spaced relation with said member to permit relative movement therebetween to remove said axle from between said jaws.

4. In an axle mounting, the combination of a side frame having spaced jaws defining a seat therebetween, said jaws having a member therebetween defining a lubricant cavity, an axle extending between said jaws, and a bearing between said axle and seat and having direct bearing engagement therewith, said frame having flanges embracing said bearing and cooperating with said axle through said bearing for limiting endwise movement thereof, a notch on said frame and a lug on said bearing insertable through said notch axially of said axle whereby said bearing is inserted into and removed from its operative position with respect to the axle and side frame, said axle being in spaced relation with said member to permit relative movement therebetween to remove said axle from said journal receiving portion.

5. In an axle mounting, the combination of a side frame having spaced jaws defining a seat therebetween, an axle extending between said jaws, said jaws extending below said axle, and a member of substantially less width than said bearing and connecting said jaws, said member defining a lubricant recess, the clearance between said axle and said member being less than the distance the bearing must be moved for disassembly from said side frame.

6. In an axle mounting, the combination of a side frame having spaced jaws defining a seat therebetween, an axle extending between said jaws, said jaws having a portion embracing said axle and formed with a lubricant recess, a bearing between said axle and seat, said bearing having means embracing a portion of said frame for limiting relative movement between said frame and bearing, the clearance between said axle and said portion being less than the distance the bearing must be moved for disassembly from said side frame.

7. In an axle mounting, the combination of a side frame having spaced jaws defining a seat therebetween, an axle extending between said jaws, said jaws having a connecting portion formed with a lubricant recess below said axle, and a bearing between said axle and seat, said bearing having means embracing a portion of said frame for limiting relative movement between said frame and bearing, said jaws having recessed portions permitting passage of said means whereby said axle and said bearing may be assembled with said frame, the clearance between said axle and said portion being less than the distance between said embracing means and said recessed portions to prevent accidental disassembly from said side frame.

8. In an axle mounting, the combination of a side frame having spaced jaws defining a seat therebetween, said jaws having a member therebetween defining a lubricant cavity, an axle extending between said jaws, and a bearing between said axle and seat and bearing directly thereon, said jaws having a portion embracing a portion of said bearing for limiting relative movement between said frame and bearing, a notch on said jaws and lugs on said bearing insertable through said notches axially of said axle whereby said bearing is inserted into and removed from its operative position with respect to the axle and side frame, said axle being in spaced relation with said member to permit relative movement therebetween to remove said axle from between said jaws.

9. In an axle mounting, the combination of a side frame having spaced jaws defining a seat therebetween, an axle extending between said jaws, said jaws having a member therebetween defining a lubricant cavity, and a bearing between said axle and seat, said jaws having a portion embracing a portion of said bearing for limiting relative movement between said frame and bearing, a notch on said jaws and lugs on said bearing insertable through said notches axially of said axle whereby said bearing is inserted into and removed from its operative position with respect to the axle and side frame, said axle being in spaced relation with said member to permit said movement of said axle with respect to said side frame.

10. In an axle mounting, the combination of a side frame having spaced jaws, a box secured to said frame between said jaws, an axle extending into said box, and a bearing between said axle and box, said box having a member of substantially less width than said bearing and defining a lubricant cavity adjacent said axle, the clearance between said axle and said member being less than the distance the bearing must be moved for disassembly from said box.

11. In an axle mounting, the combination of a side frame having spaced jaws, a box secured to said frame between said jaws, an axle extending into said box, and a bearing between said axle and box, and means on said bearing extending toward the jaws for embracing means on the portion of said box adjacent the jaws for limiting relative movement between said box and axle, said box having means permitting passage of said bearing and embracing means whereby said axle and said bearing may be assembled with said frame.

12. In an axle mounting, the combination of a side frame, a box secured thereto and having portions defining a seat, an axle extending between said portions, a bearing between said axle and seat and cooperating therewith, said bearing having spaced side lugs adapted to embrace the side walls of said box for limiting lateral movement of said bearing in normal operation with relation to said side frame, said side walls having recessed portions for permitting the passage of said lugs through said recessed portions to permit removal of said bearing from said box.

13. In a shaft mounting, the combination of a frame member having an opening therethrough, a shaft member having a bearing portion extending through said frame member, a bearing member extending through said frame member and engaging said bearing portion, said bearing having a crowned portion rockably engaging said frame member, and means on said bearing member and frame member for positioning said bearing member, said opening having enlarged laterally extending portions whereby a portion of said means may be inserted for positioning said bearing member.

14. In a shaft mounting, the combination of a frame member having an opening therethrough, a shaft member having a bearing portion extending through said frame member, a bearing member disposed in said opening and engaging said bearing portion, said bearing having a crowned portion rockably engaging said frame member, and means on said bearing member and frame member for positioning said bearing member, said opening having enlarged laterally extending portions whereby a portion of said means may be inserted for positioning said bearing member.

15. In a truck, the combination of a side frame having spaced jaws for accommodating the normally stationary axle of a wheel and axle assembly, said jaws having a member therebetween defining a lubricant cavity, said axle having a bearing portion, a bearing member interposed between the bearing portion and said jaws and cooperating with said bearing portion, said bearing member and a portion of the side frame having an interlocking portion, a notch on said jaws and lugs on said bearing member insertable through said notches axially of said axle whereby said bearing member is inserted into and removed from its operative position with respect to the axle and side frame, the end of said axle extending outwardly of said side frame and member, said axle being in spaced relation with said first mentioned member to permit relative movement therebetween to remove said axle from between said jaws.

16. In a truck, the combination of a side frame having a journal receiving portion for accommodating an axle of a wheel and axle assembly, said journal receiving portion having spaced substantially vertically disposed guide members and a member therebetween defining a lubricant cavity below said axle, and a bearing member interposed between said axle and side frame and directly engaging the same, said member having means interlocking with said guide members and axle, said means including a notch on said frame and a lug on said bearing member insertable through said notch axially of said axle whereby said bearing is inserted into and removed from its operative position with respect to the axle and side frame, said axle being in spaced relation with said first-named member to permit relative movement therebetween to remove said axle from said journal receiving portion.

17. In a truck, the combination of a side frame having a journal receiving portion for accommodating an axle of a wheel and axle assembly, said journal receiving portion having spaced substantially vertically disposed guide members and a member therebetween defining a lubricant cavity below said axle, and a bearing member interposed between said axle and side frame and directly engaging the same, said member having a portion interlocking with said guide members and axle, a notch on said portion and lugs on said bearing member insertable through said notches axially of said axle whereby said bearing member is inserted into and removed from its operative position with respect to the axle and side frame, said axle being in spaced relation with said first-named member to permit relative movement therebetween to remove said axle from said journal receiving portion.

18. In a truck, the combination of a side frame having a journal receiving portion for accommodating an axle of a wheel and axle assembly, said portion including a member defining a lubricant cavity below said axle, and a member disposed between said axle and side frame and having bearing relation with said axle and side frame, said second named member having means interlocking with said journal receiving portion and axle, said means including a notch on said frame and a lug on said second named member insertable through said notch axially of said axle whereby said second named member is inserted into and removed from its operative position with respect to the axle and side frame, said axle being in spaced relation with said first-named member to permit relative movement therebetween to remove said axle from said journal receiving portion.

19. In a truck, the combination of a side frame having a journal receiving portion for accommodating an axle of a wheel and axle assembly, said portion including a member defining a lubricant cavity below said axle, and a member disposed between said axle and side frame and having bearing relation with said axle and side frame, said second named member having a portion interlocking with said journal receiving portion and axle, a notch on said portion and lugs on said second named member insertable through said notches axially of said axle whereby said second named member is inserted into and removed from its operative position with respect to the axle and side frame, said axle being in spaced relation with said first-named member to permit relative movement therebetween to remove said axle from said journal receiving portion.

20. In a truck, the combination of a side frame having a journal receiving portion for accommodating an axle of a wheel and axle assembly, said journal receiving portion having spaced substantially vertically disposed guide members and a member therebetween defining a lubricant cavity below said axle, and a member disposed between said axle and side frame and having bearing relation with said axle and side frame, said second named member having means interlocking with said guide members and axle, said means including a notch on said frame and a lug on said second named member insertable through said notch axially of said axle whereby said second named member is inserted into and removed from its operative position with respect to the axle and side frame, said axle being in spaced relation with said first-named member to permit relative movement therebetween to remove said axle from said journal receiving portion.

21. In an axle mounting, the combination of a side frame having a journal receiving portion provided with a seat, an axle extending into said journal receiving portion, a bearing between said axle and seat, said journal receiving portion having a member of substantially less width than said bearing and defining a lubricant cavity substantially beneath said axle, the clearance between said axle and said member being less than the distance the bearing must be moved for disassembly from said side frame.

22. In a shaft mounting, the combination of a frame having a journal receiving portion having an opening therethrough, a shaft member extending into said opening, a bearing disposed in said opening and between said shaft and frame, and means on said bearing and journal receiving portion for positioning said bearing, said means on said bearing extending laterally of said opening, the opening of said frame having an enlarged portion whereby the means on said bearing may be inserted through and removed through said enlarged portion axially with respect to said shaft for assembling said bearing in operative association with said journal receiving portion.

23. In a truck, the combination of a side frame having a journal receiving portion associated therewith for accommodating an axle of a wheel and axle assembly, said portion having an opening into which said axle extends, a bearing member disposed between said axle and journal receiving portion and having bearing relation therewith, and means comprising a lug on said bearing member and an abutment on said journal receiving portion cooperating therewith for interlocking said bearing member with said journal receiving portion, said journal receiving portion having a notch extending laterally of said opening for receiving said lug, whereby said bearing member may be inserted into and removed from operative position axially with respect to said axle.

24. In a truck, the combination of a side frame having a journal receiving portion associated therewith for accommodating an axle of a wheel and axle assembly, said portion having an opening into which said axle extends, said opening being defined in part by spaced abutments, a bearing member disposed between said axle and journal receiving portion and having bearing relation therewith, and means comprising spaced lugs on said bearing member adapted to cooperate with said abutments for interlocking said bearing member with said journal receiving portion, said journal receiving portion having spaced notches extending laterally of said opening for receiving said lugs whereby said bearing member may be inserted into and removed from operative position axially with respect to said axle.

FRED E. BACHMAN.